(12) United States Patent
Nardetto et al.

(10) Patent No.: US 9,289,810 B2
(45) Date of Patent: Mar. 22, 2016

(54) APPARATUS AND METHOD FOR MEASURING THE BENDING ANGLE OF A SHEET

(71) Applicant: SALVAGNINI ITALIA S.p.A., Sarego (Vicenza) (IT)

(72) Inventors: Gianfranco Nardetto, Abano Terme (IT); Flavio Battistelli, Montalcino (IT)

(73) Assignee: SALVAGNINI ITALIA S.P.A., Sarego (Vicenza) (IT)

( * ) Notice: Subject to any disclaimer, the term of this patent is extended or adjusted under 35 U.S.C. 154(b) by 275 days.

(21) Appl. No.: 13/875,635

(22) Filed: May 2, 2013

(65) Prior Publication Data
US 2013/0291610 A1 Nov. 7, 2013

(30) Foreign Application Priority Data
May 4, 2012 (IT) .............................. MI2012A0751

(51) Int. Cl.
*B21D 5/00* (2006.01)
*G01B 11/26* (2006.01)

(52) U.S. Cl.
CPC ................ *B21D 5/006* (2013.01); *G01B 11/26* (2013.01)

(58) Field of Classification Search
CPC .......... B21D 5/004; B21D 5/006; B21D 5/02; G01B 11/03; G01B 11/26; G01B 21/22; G06K 9/00201; G06K 9/2036
USPC ......................................... 72/31.1, 31.11, 37
See application file for complete search history.

(56) References Cited

U.S. PATENT DOCUMENTS

| | | | |
|---|---|---|---|
| 5,103,488 A * | 4/1992 | Gemello et al. ............... | 382/199 |
| 5,761,940 A | 6/1998 | Moore, Jr. et al. | |
| 6,708,541 B1 * | 3/2004 | Matsumoto et al. ........... | 72/31.1 |
| 7,802,456 B2 * | 9/2010 | Ikeda et al. ................... | 72/31.05 |
| 8,553,989 B1 * | 10/2013 | Owechko et al. ............. | 382/224 |

FOREIGN PATENT DOCUMENTS

| | | |
|---|---|---|
| EP | 1 102 032 | 5/2001 |
| EP | 1 204 845 | 4/2005 |
| WO | 01/14826 | 3/2001 |

OTHER PUBLICATIONS

Search Report and Written Opinion issued Sep. 4, 2012 in corresponding Italian Application No. MI20120751.

(Continued)

*Primary Examiner* — Edward Tolan
(74) *Attorney, Agent, or Firm* — Wenderoth, Lind & Ponack, L.L.P.

(57) ABSTRACT

An apparatus for measuring a bending angle of a sheet, comprising a processing unit and at least one sensor comprising a light source which projects a light pattern on at least one side of the sheet, and recording means adapted to record an image of the projection of said light pattern on the at least one side of the sheet. The processing unit is adapted to control the recording means for recording the image in at least one time instant (Treg1; Treg1, Treg2 . . . Tregn) during an operation of bending the sheet; a control unit is capable of transforming the recorded image into a point cloud and comprises a neural network adapted to associate a bending angle value with the point cloud.

20 Claims, 9 Drawing Sheets (56) References Cited

OTHER PUBLICATIONS

Zemin Fu et al., "Using genetic algorithm-back propagation neural network prediction and finite-element model simulation to optimize the process of multiple-step incremental air-bending forming of sheet metal", Materials and Design, London, GB, vol. 31, No. 1, Jan. 1, 2010, pp. 267-277, XP026573916.

* cited by examiner

APPARATUS AND METHOD FOR MEASURING THE BENDING ANGLE OF A SHEET

BACKGROUND OF THE INVENTION

1. Field of the Invention

The present invention concerns an apparatus and method for measuring a bending angle of a sheet.

2. Description of Related Art

Press brake machines adapted to bend metal sheets and obtain profiles with appropriate bending angles are known in the prior art.

Said press brake machines may be provided with bending angle measuring systems comprising a processing unit (computer) and one or more sensors; each sensor normally comprises means adapted to project a light pattern and means adapted to record the pattern deformation during the operation of bending the sheet.

EP 1102032 describes a method for measuring the bending angle of a sheet and a device for measuring said bending angle.

The method comprises measuring, on two sides of a member, e.g. the die, a number of distances on a plane which intersects the sheet and the member. Said distances comprise a number of distances between a measuring instrument and various points on the sheet and a number of further distances between the measuring instrument and various points on the member, so as to determine, for each side of the member, a respective profile of the measured distances and, from the profiles of these distances, the respective angles between sheet and member; the bending angle of the sheet is determined as a function of the angles determined between sheet and member.

The measuring device comprises, on two sides of a member, e.g. the die, an instrument for measuring a number of distances from a plane which intersects the sheet and the member. Said distances comprise a number of distances between a measuring instrument and various points on the sheet and a number of further distances between the measuring instrument and various points on the member. The device comprises means adapted to determine, for each side of the member, a respective profile of the measured distances and means for determining, from the profiles of these distances, the respective angles between sheet and member; the bending angle of the sheet is determined as a function of the angles determined between sheet and member.

EP 1204845 describes a process for detecting a bending angle and an apparatus for determining the change in the bending angle of a sheet during the bending operation.

The process comprises a light beam, which is directed towards a side of the workpiece, the angular position of which must be measured, and is constructed as a light plane or light cone, as a light line or path or, in particular, as a symmetric geometric shape which is produced either on the workpiece or on one side thereof. The change in the position of the contact point during the bending operation is detected in an opto-electronic manner, e.g. by means of a video camera, in particular by means of an array video camera, and the angular position of the side of the workpiece is calculated by the changes in the position of the contact point seen by the video camera.

The light line or path, or the symmetry line of the geometric shape, is projected either parallel or essentially parallel to the bending line of the workpiece on the side of the workpiece, and the change in the angle of the side of the workpiece is calculated by the extension of the parallel translation of said line or lines as seen by the video camera.

The apparatus comprises a measuring beam or light source and a receiver, which records the light paths produced on the workpiece by the measuring beam or light source, in particular an array video camera, and a computer which calculates the angular changes resulting from the changes in position of the light path or paths. The measuring beam or light source is arranged or configured so that the produced path forms at least a slightly curved line or a straight line or a geometrically symmetric shape, surface or figure in order to perform the process as shown above. The apparatus is characterized in that the measuring beam or light source is arranged so that the light line or lines or the like, as the light angle contour delimited in a linear manner, or the symmetry line of the geometric shape, is (or are) arranged so as to extend either parallel or essentially parallel to the bending angle.

SUMMARY OF THE INVENTION

In the light of the prior art, it is the object of the present invention to provide an apparatus for measuring the bending angle of a sheet which is different from those known.

In accordance with the present invention, said object is achieved by means of an apparatus for measuring a bending angle of a sheet comprising a processing unit and at least one sensor comprising a light source projecting a light pattern on at least one side of the sheet, and recording means adapted to record the image of the projection of said light pattern on at least one side of the sheet, characterized in that said processing unit is configured to control said recording means for recording the image in at least one time instant during the bending operation of the sheet, said processing unit being capable of transforming the recorded image in a point cloud and comprising a neural network configured to associate a bending angle value with said point cloud, said processing unit being configured to check if said bending angle value is equal to the desired bending angle value of the sheet and if the check operation is negative, it is adapted to drive the recording means for recording the image in a plurality of successive time instants, spaced by time intervals not equal to zero, during the bending operation of the sheet until the apparatus reaches the desired measurement value of the bending angle value of the sheet, said processing unit in each of said time instants being capable of transforming the image recorded into a point cloud and said neural network, again in each of said time instants, being adapted to associate a bending angle value of the sheet with said point cloud.

The features and advantages of the present invention will become apparent from the following detailed description of a practical embodiment thereof, illustrated by way of non-limitative example in the accompanying drawings, in which:

DETAILED DESCRIPTION OF THE INVENTION

FIGS. 1-7 show an apparatus 2 for measuring the bending angle of a sheet 3 in a press brake machine 1. The press brake machine 1 is typically provided with a die 9 (FIGS. 1, 2, 4-7) supported by a support 11; die 9 is of the interchangeable type to allow various bending types. The press brake machine 1 comprises a bending blade 12 (FIGS. 6, 7) actuated by a mechanical assembly 13 so as to impress a longitudinal fold according to a line P on the sheet 3, interposed between die 9 and bending blade 12. Thereby, reference numerals 31 and 32 are the two surfaces or sides of sheet 3 adjacent to the bending line P, with the sheet 3 either during or after the step of bending.

Figure 1:
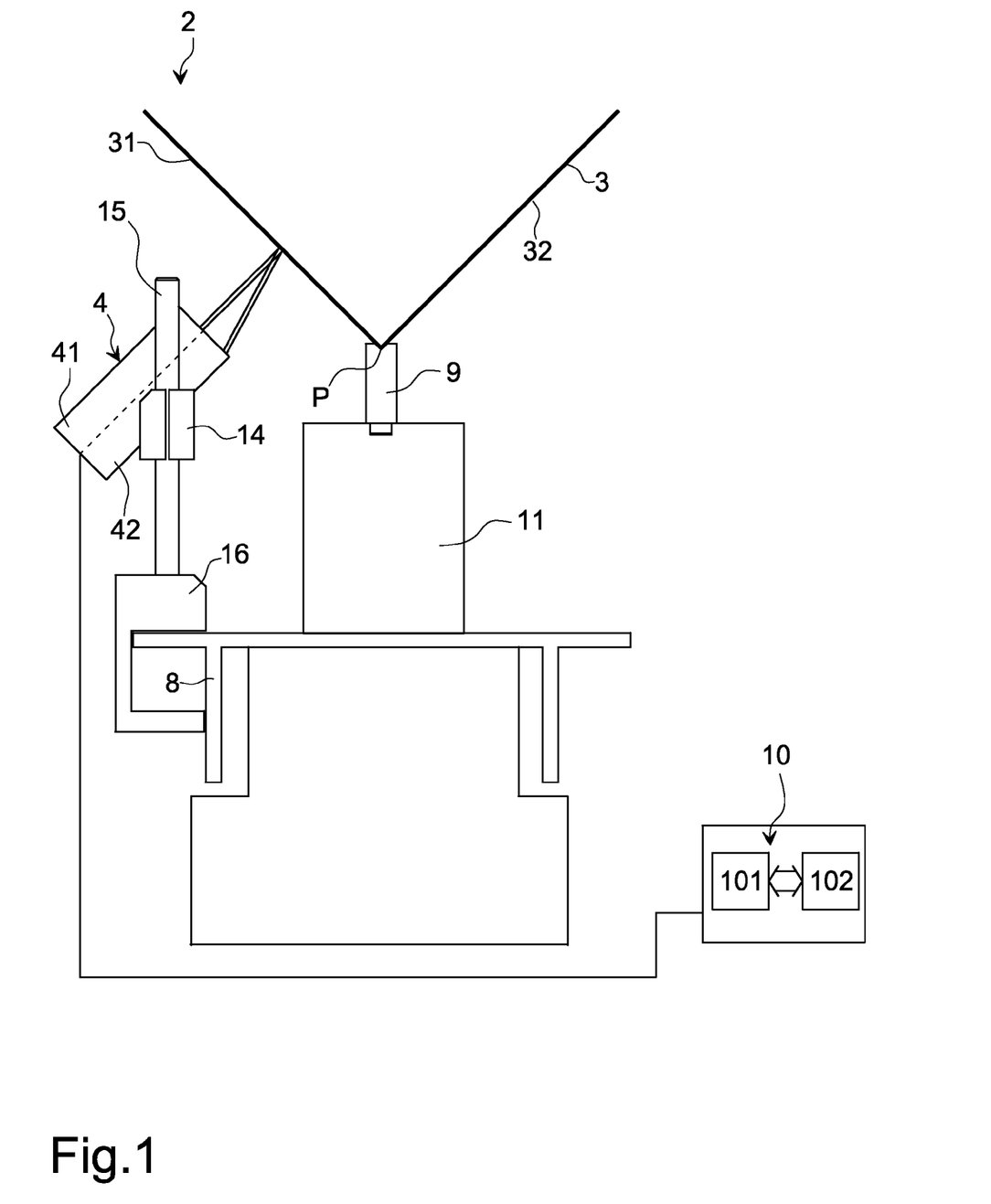
FIG. 1 shows a section view of a measuring device of the bending angle of a sheet according to an embodiment of the present invention and provided with one single sensor.
Figure 2:
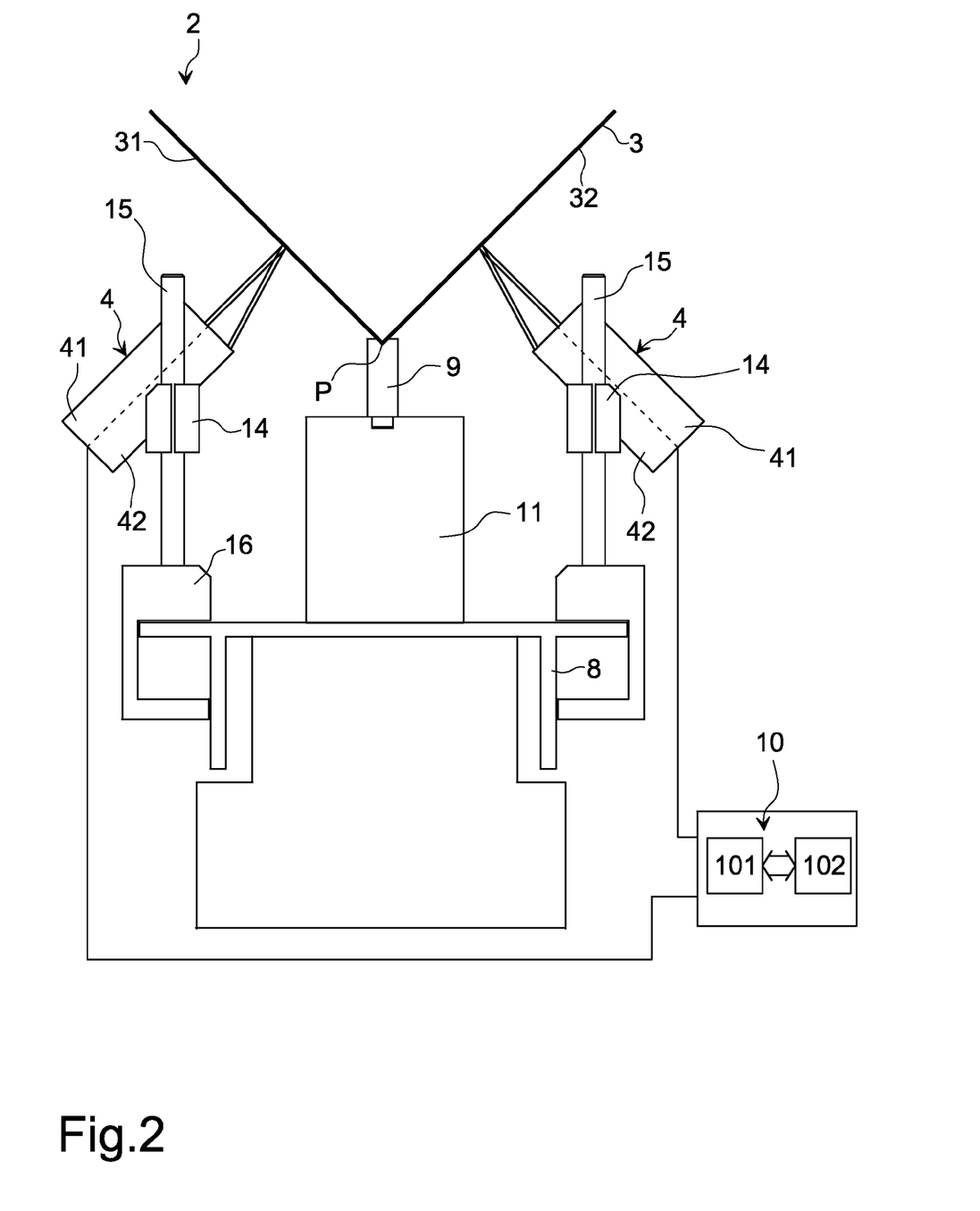
FIG. 2 shows a section view of a measuring device of the bending angle of a sheet provided with two sensors according to a variant of the embodiment of the present invention.

The measuring apparatus 2 comprises at least one sensor 4 (FIG. 1) comprising a recording means 41, e.g. a video camera or photo camera, and a structured light illuminating source 42, e.g. a laser; two sensors 4 are preferably included (FIG. 2).

Each sensor 4 is supported by a clamp 14 and is adjustable in height by means of rods 15 on which clamp 14 can slide. Said rods 15 are integral with a support element 16 sliding along guides 8 which are longitudinal with respect to die 9.

The light source 42 is adapted to project a light pattern on a surface 31, 32 of the sheet 3. A light pattern means any geometric shape, a line, a plurality of parallel lines or incident lines or a point array.

The recording means 41 are adapted to record the image of the light pattern projected by the light source 42 on the surface 31, 32 of sheet 3, i.e. the deformed light pattern projected on the sheet being bent.

The recording means 41 and the lighting source 42 are connected to a processing unit 10 comprising a microprocessor 101 and a memory 102 on which an application software is installed and runs. Indicatively, the processing unit 10 may be considered as a set of sections or parts for controlling devices 41, 42 and for processing the images recorded by the recording means 41. The sections correspond to the various functions of the application software installed and running in memory 102.

The processing unit 10 (FIG. 8) comprises a section 110 adapted to control the light source 42 for illuminating the surface 31, 32 of sheet 3 and adapted to subsequently control the recording means 41 for recording the image obtained on the surface 31, 32 by the projection of the light pattern resulting from source 42.

Figure 8:
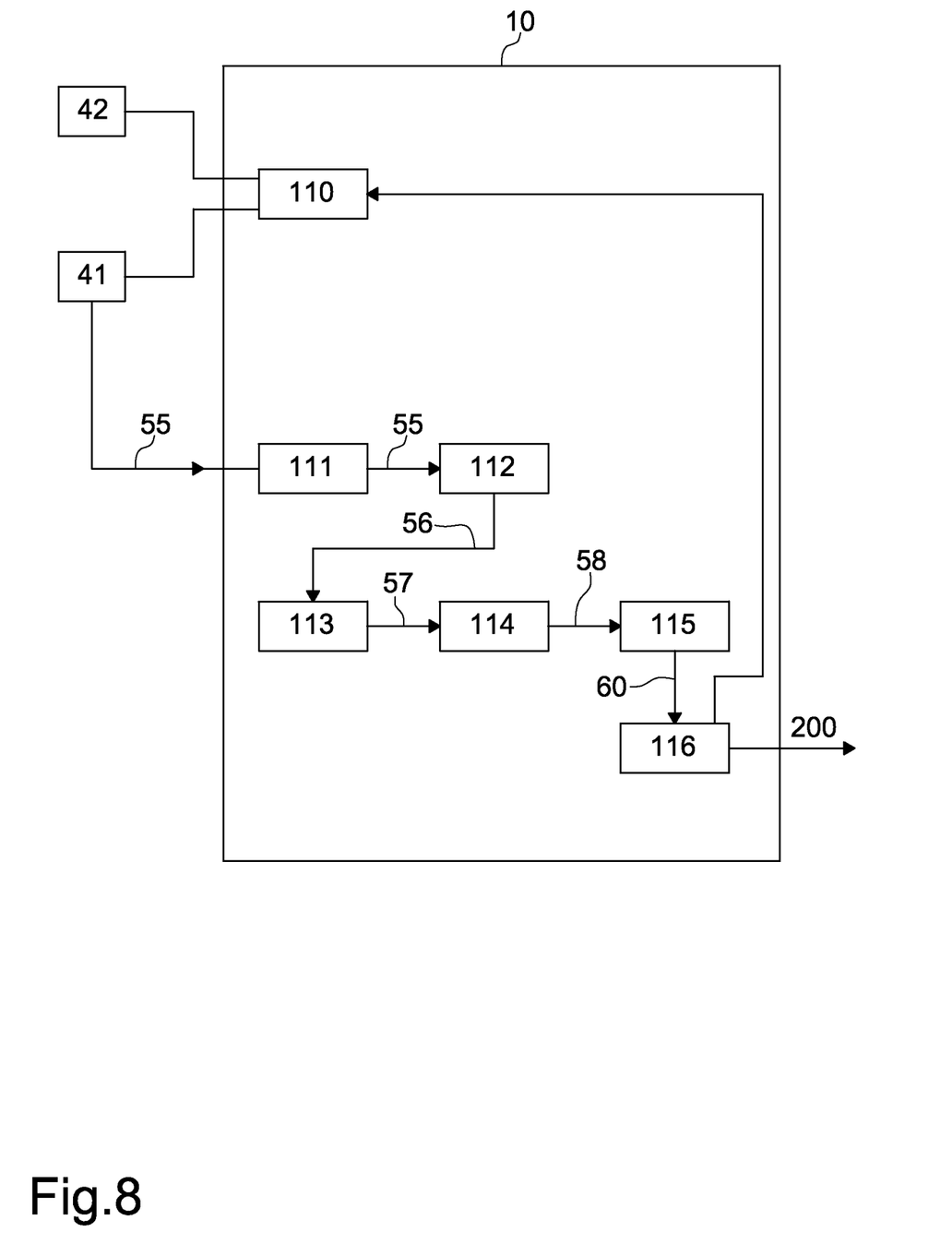
FIG. 8 shows a block chart of the apparatus according to the present invention.

In accordance with the present invention, the camera means 41 are configured to record the image obtained on the surface 31, 32 by the projection of the light pattern during the operation of bending sheet 3 at least in one time instant Treg1, but preferably in a plurality of subsequent time instants Treg1, Treg2 . . . Tregn, spaced apart by time intervals Td which are not zero until the required measuring value of the bending angle of sheet 3 is achieved. The time intervals Td preferably have the same duration, i.e. 15 milliseconds.

Figure 3:
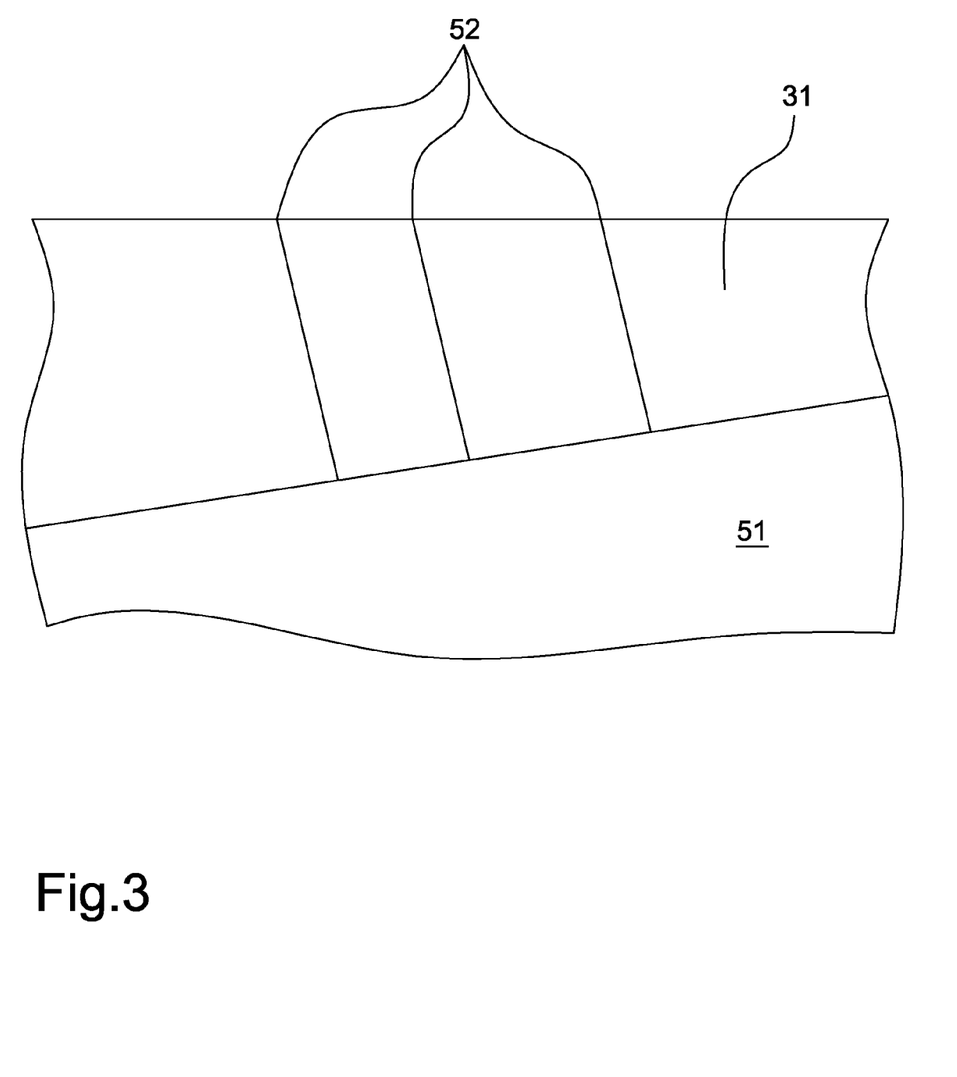
FIG. 3 shows a light pattern with three inclined lines, projected onto the sheet subjected to bending and the mask used for concealing the die.
Figure 4:
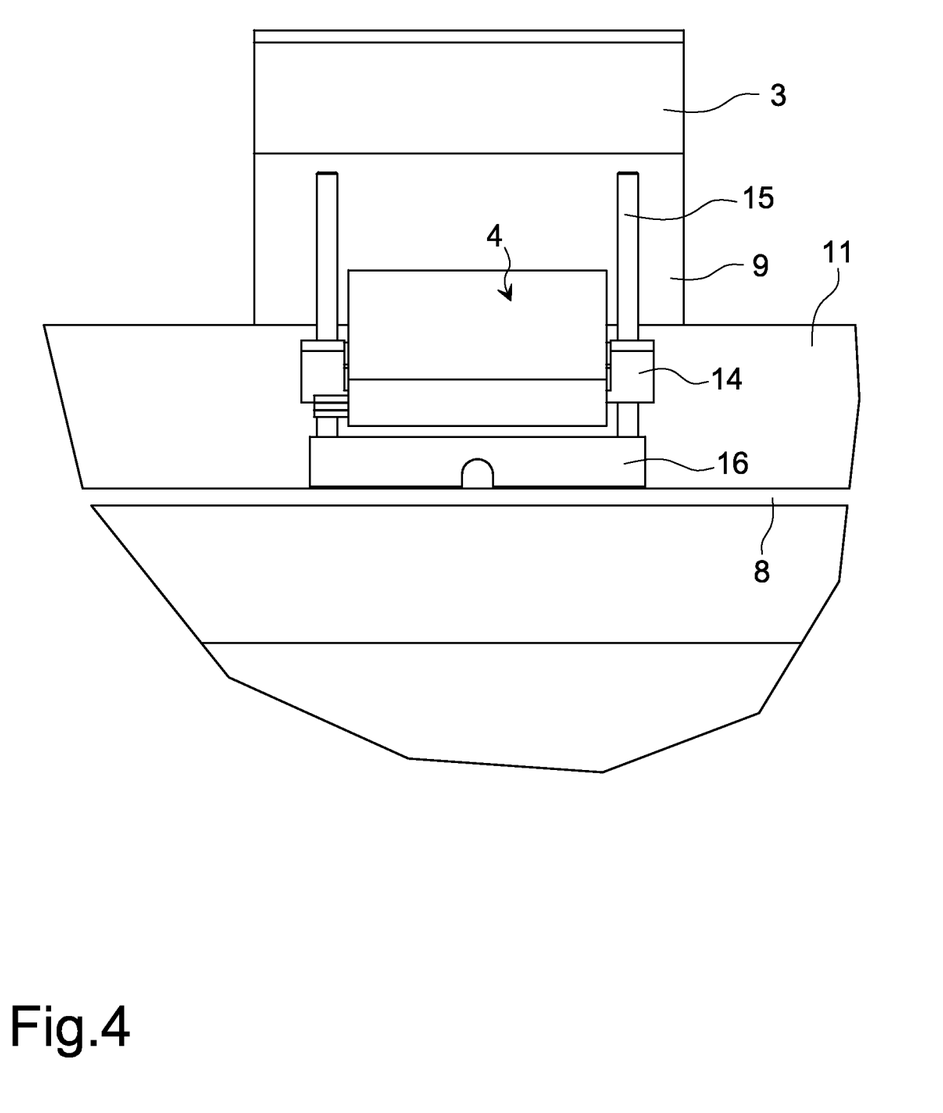
FIG. 4 shows a front view of the measuring apparatus of the bending angle in FIG. 1.
Figure 5:
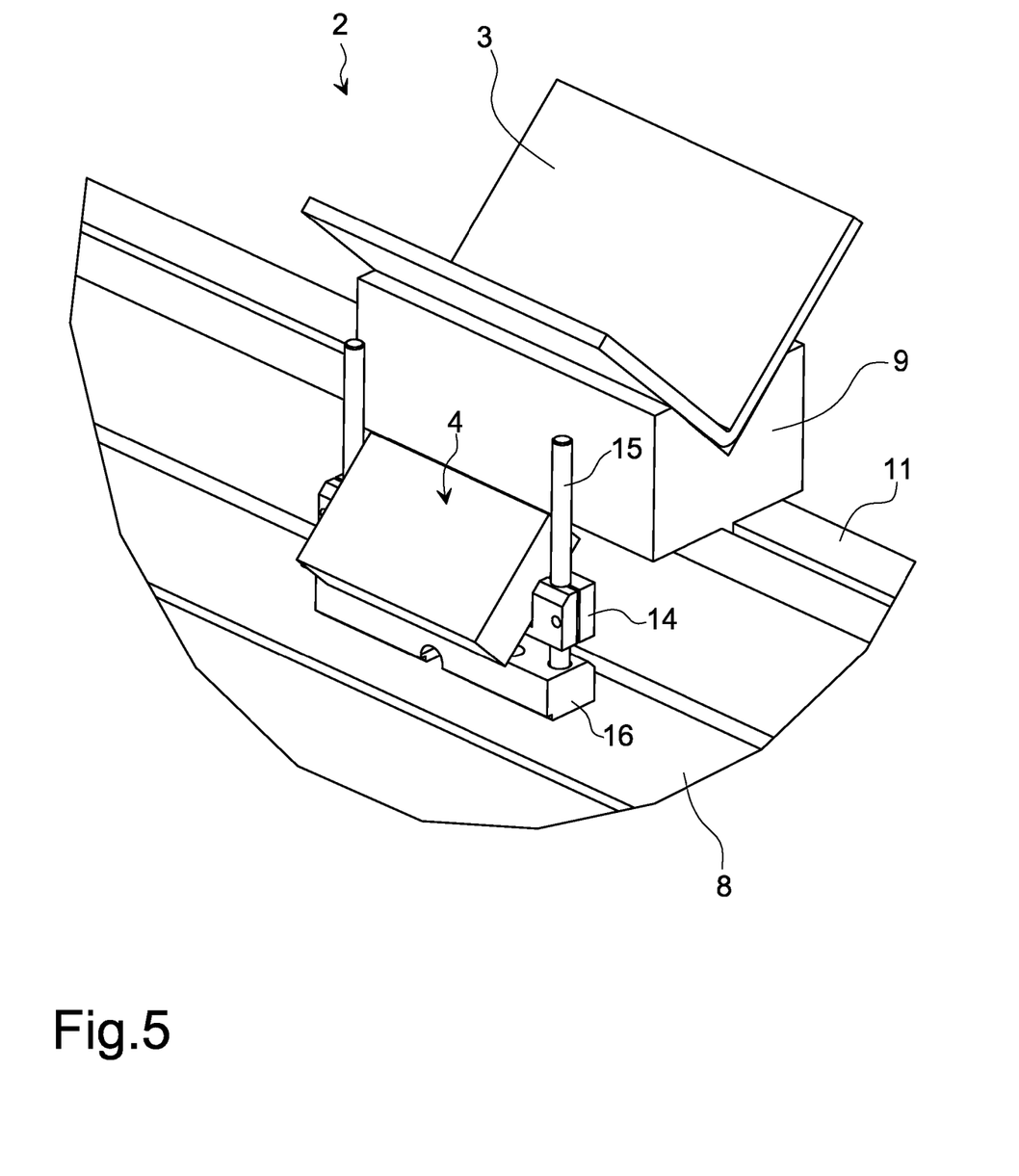
FIG. 5 shows a perspective view of the measuring apparatus of the bending angle in FIG. 1.
Figure 6:
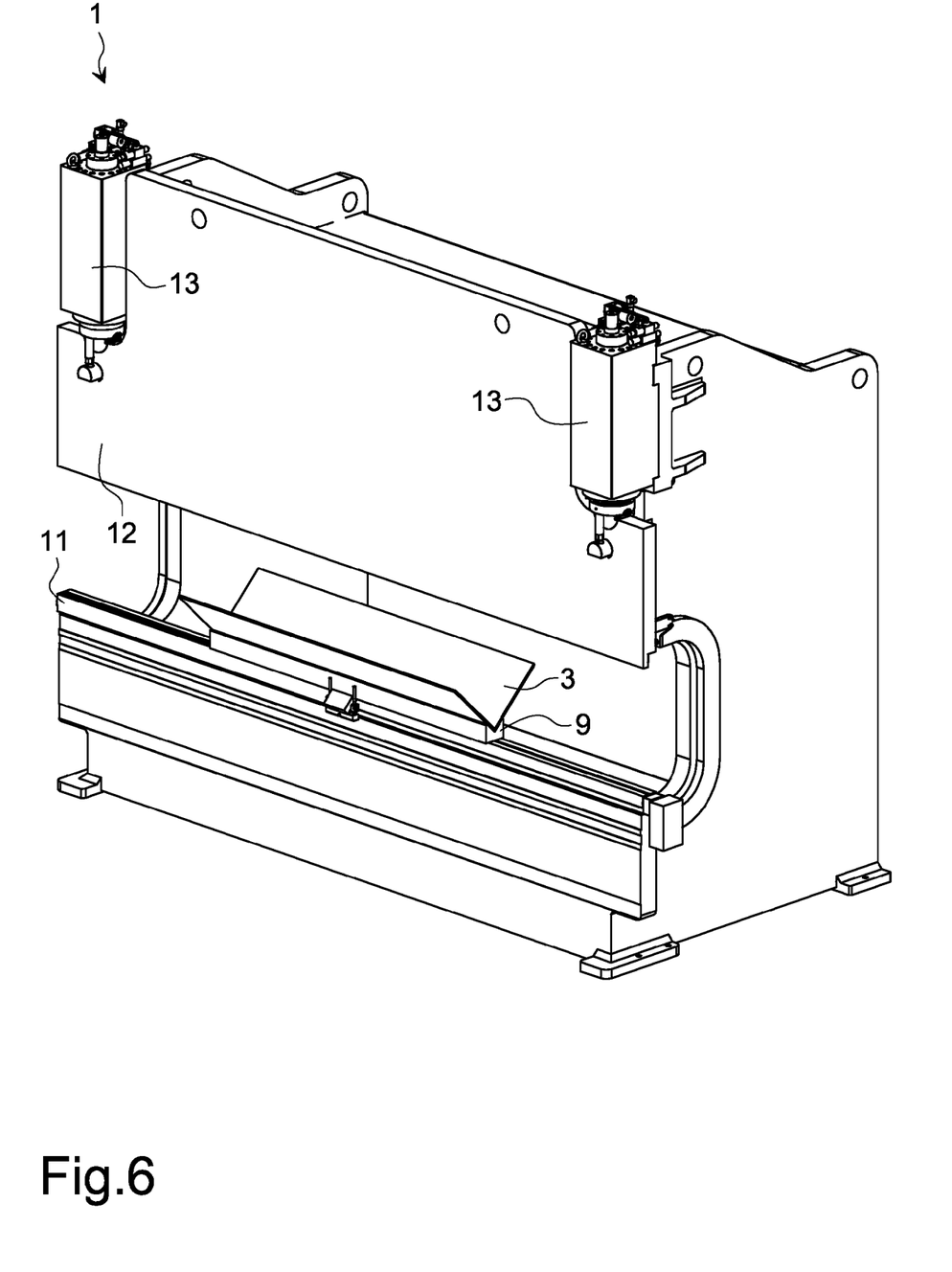
FIG. 6 shows a perspective view of a press brake machine comprising the measuring apparatus of the bending angle of a sheet according to the present invention.
Figure 7:
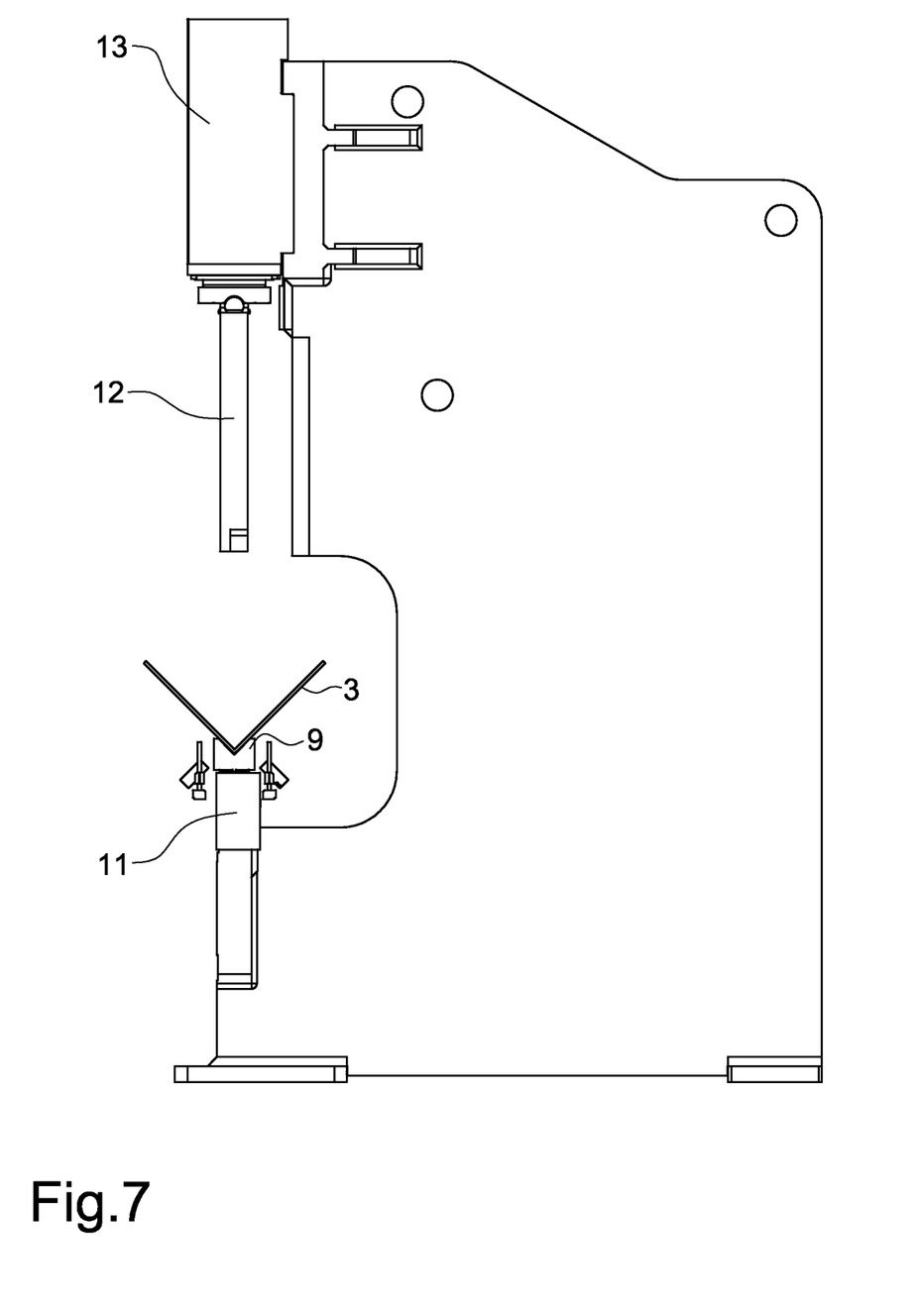
FIG. 7 shows a side view of the press brake machine in FIG. 6.

The light pattern preferably comprises a plurality of lines 52 inclined with respect to one another and projected either parallel or essentially parallel to the surface 31, 32 of sheet 3 (FIG. 3). In particular, the number of inclined lines 52 may be two or three.

The recording means 41 record the image 55 during the operation of bending sheet 3 at least in one time instant Treg1, but preferably in time instants Treg1, Treg2 . . . Tregn.

In each time instant Treg1, Treg2 . . . Tregn, the image of the deformed pattern 55 is sent to the processing unit 10, in particular to the section 111, by means of a wired or wireless connection.

In section 112, the processing unit 10 preferably applies a mask 51 for concealing die 9 in the recorded image 55 so as to ignore the portion of light pattern projected onto the die 9 itself.

The processing unit 10, again in section 112, then processes the light sources of the recorded image 55 to discriminate the laser light pattern from the background represented by the surface 31, 32 of sheet 3; the recorded light pattern 56 is obtained in this manner.

The processing unit 10, in section 113, is adapted to process said recorded pattern 56 to obtain a point cloud 57.

Another section 114 of the processing unit 10 is adapted to sample the points of the point cloud 57 in order to reduce the amount of data to be processed; a plurality of samples 58 is obtained which, after a reassembly step again in section 114, are input to another section 115 comprising a neural network.

Samples 58 may be chosen in a random manner. In all cases, the samples preferably refer to an area 300 of the surface 31, 32 of sheet 3 over die 9, preferably at a distance of 20 millimeters from die 9; thereby, by choosing the samples in the area 300 a greater measuring accuracy and fastening measuring operation speed is obtained.

The number of samples 58 preferably varies from 200 to 300.

The neural network 115 can detect a bending angle on the basis of the configuration of the points input thereto, i.e. according to the plurality of samples 58 which are supplied as inputs.

The neural network 115 should be trained to provide a bending angle from samples of a point cloud before being used, i.e. should have previously processed an appropriate amount of configurations.

In general, the neural network 115 can suggest a linearization of the problem for which a solution is sought. Such a linearization expresses the statistic probability that a new case, never examined before, falls within a solution area which has been already checked and validated during the step of training. This result is intrinsically capable of compressing an amount of data because, once the numerical model has been learnt, the neutral network does not need to access a database from where to pick the correspondences between configurations of points and bending angle, as it is capable of autonomously reconstructing them.

The training is further sampled, i.e. an amount of data to be stored is smaller because the neural network can reconstruct the remaining data by interpolation. In the case in hand, only some of the configurations of a plurality of point cloud samples, and not all the possible configurations, are stored during the step of training. The neural network 115 thus learns the relationships between the input variable (plurality of samples of the point cloud) and the output variable (bending angle) and is proven to be able to reproduce not only the point configurations which were never found before but also those which have already been seen, not needing to have a database of images available. Furthermore, working with point clouds does not require algorithms to solve the problem of image distortion which would occur in case of measurement strategies based on distance calculation (e.g. the angle between two lines).

The bending angle 60 at the output from the neural network 115 is input into a section 116 which checks whether the bending angle 60 is equal to that desired. If the check is negative, the measurement of the bending angle of sheet 3 is repeated in subsequent time instants Treg1, Treg2 . . . Tregn until a desired measurement angle value is achieved, i.e. until the checking operation is positive; whenever the operation is negative, section 116 informs the control section 110 to control the recording means and make a new recording of the image obtained on the surface 31, 32 by the projection of light pattern resulting from the source 42. Section 116 also preferably checks coherence of data output from the neural network 115; in case of positive result of both the coherence check operation and the checking operation, the measurement value 200 is sent to the user.

Figure 9:
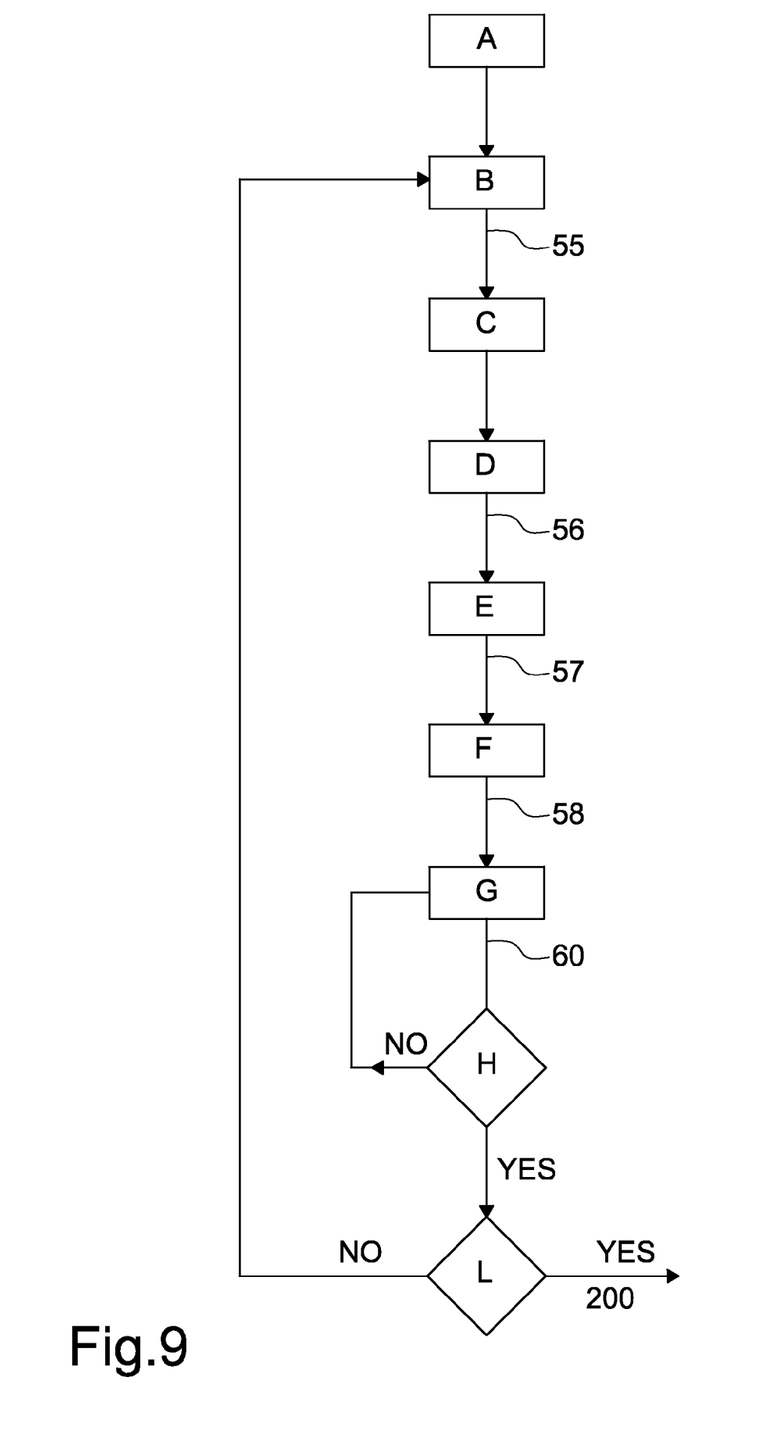
FIG. 9 shows the flow chart of the method for measuring the bending angle according to the present invention.

The processing unit 10 works in the following manner (FIG. 9).

There are a first step A of controlling the projection of the light pattern on one or both surfaces 31, 32 of sheet 3, and a step B of recording the image obtained on the surface 31, 32 by the light pattern projection during the operation of bending sheet 3 in a time instant Treg1.

There are then a step C of applying a mask 51 for concealing die 9 in the recorded image 55, and a step D of discriminating the laser light pattern from the background represented by the surface 31, 32 of sheet 3 so as to obtain a recorded light pattern 56.

Subsequently, there are a step E of transforming the recorded light pattern 56 into a point cloud 57, and a subsequent step F of sampling the point cloud 57 in order to obtain a plurality of samples 58, and a step of reassembling the samples.

At step G, the plurality of reassembled samples 58 are processed by a neural network for identifying the bending angle 60 corresponding to said plurality of reassembled samples 58.

The coherence of the bending angle 60 is preferably checked during a subsequent step H; in case of positive result (Yes), the value 60 of the bending angle is the output for the subsequent step L, otherwise (No) step G resumes.

At step L, there is a step of checking in which it is evaluated whether the value 60 of the bending angle obtained in the time instant Treg1 is the one desired; if this is so (Yes), the measuring method ends, otherwise (NO) another measurement of the bending angle is made in a subsequent instant Treg2, after a time interval Td from instant Treg1, i.e. the measuring method resumes from step B or, if the projection of light pattern on one or both surfaces 31, 32 of sheet 3 is also not continuous but discontinuous, the measuring method resumes from step A by controlling the projection of the light pattern.

At step L, there is a new step of checking in which it is evaluated whether the value of measurement 60 of the bending angle obtained in time instant Treg2 is the desired one; if this is so (Yes), the measuring method ends, otherwise (NO) another measurement of the bending angle is carried out in a later instant Treg3, after the time interval Td of instant Treg2, i.e. a measuring method resumes from step B or A again.

The measuring method continues in the subsequent instants Treg3 . . . Tregn until it is checked that at step L the measurement value obtained is that desired and the measuring value 200 is thus transmitted to the user.

The invention claimed is:

1. An apparatus for measuring a bending angle of a sheet, comprising:
    a processing unit, and
    at least one sensor comprising a light source configured to project a light pattern on at least one side of the sheet and recording means configured to record an image of the projection of said light pattern on the at least one side of the sheet,
    wherein said processing unit is configured to control said recording means for recording the image in at least one time instant during a bending operation of the sheet, said processing unit being capable of transforming the recorded image in a point cloud and comprising a neural network configured to associate a bending angle value to said point cloud,
    wherein said processing unit is configured to check if said bending angle value is equal to a desired bending angle value of the sheet and, if said check operation is negative, said processing unit is adapted to drive said recording means for recording the image in a plurality of successive time instants, spaced by intervals not equal to zero, during the bending operation of the sheet until said desired bending angle value of the sheet is achieved by said apparatus,
    wherein said processing unit, in each one of said time instants, is capable of transforming the image recorded in said point cloud and said neural network, always in each one of said time instants, and is configured to associate said bending angle value of the sheet to said point cloud, and
    wherein said processing unit is configured to train said neural network by providing bending angles from a plurality of samples of point clouds to said neural network such that said neural network learns relationships between said plurality of samples of point clouds and said bending angles in order to associate said bending angle value to said point cloud during measuring.

2. The apparatus according to claim 1, wherein said processing unit is configured to sample said point cloud and to send a plurality of samples in input to said neural network, said neural network being configured to associate said bending angle value to said plurality of samples.

3. The apparatus according to claim 1, wherein said light pattern comprises a plurality of inclined lines.

4. The apparatus according to claim 3, wherein said light pattern consists of two inclined lines.

5. The apparatus according to claim 1, wherein said processing unit is configured to process light thresholds of the recorded image by said recording means so as to discriminate said light pattern from a background represented by the sheet.

6. A press brake machine comprising an apparatus for measuring a bending angle of a sheet as defined in claim 1.

7. A press brake machine according to claim 6, further comprising a die for bending sheet metal, said processing unit being adapted to mask said die so as to neglect a portion of said light pattern recorded by said recording means which is relative to said die.

8. A method for measurement of a bending angle of a sheet, comprising:
    training a neural network by providing bending angles from a plurality of samples of point clouds to said neural network such that said neural network learns relationships between said plurality of samples of said point clouds and said bending angles,
    projecting a light pattern on at least one side of the sheet, recording an image relative to the projection of said light pattern on the at least one side of the sheet, wherein said recording occurs in at least one time instant during a bending operation of the sheet, transforming the recorded image in a point cloud and associating a bending angle value to said point cloud by application of said neural network, verifying if said bending angle value of the sheet is equal to a desired bending angle value of the sheet and, if said verifying step is negative, repeating said steps of recording the image, transforming the recorded image in said point cloud and associating said bending angle value to said point cloud by application of said neural network for subsequent time instants, spaced by different time intervals not equal to zero, during the bending operation of the sheet until said desired bending angle value of the sheet is achieved.

9. The method according to claim 8, further comprising sampling said point cloud in order to obtain a plurality of samples and applying said neural network to said plurality of samples to obtain said bending angle value.

10. The method according to claim 8, wherein said light pattern comprises a plurality of inclined lines.

11. The method according to claim 10, wherein said light pattern is formed by two inclined lines.

12. The method according to claim 8, further comprising, after said recording step, processing light thresholds of the recorded image by said recording means so as to discriminate said light pattern from a background represented by the sheet.

13. The method according to claim 12, wherein the bending operation of the sheet is carried out by application of a die, said method further comprising masking said die before said step of processing said light thresholds.

14. The method according to claim 8, wherein, during said training of said neural network, only certain configurations of sampled point clouds are stored.

15. The method according to claim 8, further comprising a control of coherence of data provided in output by said neural network before transmission of said data to a user.

16. A press brake machine comprising an apparatus for measuring a bending angle of a sheet as defined in claim 2.

17. A press brake machine comprising an apparatus for measuring a bending angle of a sheet as defined in claim 3.

18. A press brake machine comprising an apparatus for measuring a bending angle of a sheet as defined in claim 4.

19. A press brake machine comprising an apparatus for measuring a bending angle of a sheet as defined in claim 5.

20. A press brake machine according to claim 16, further comprising a die for bending sheet metal, said processing unit being adapted to mask said die so as to neglect a portion of said light pattern recorded by said recording means which is relative to said die.

* * * * *